United States Patent
Herren

(10) Patent No.: US 6,593,541 B1
(45) Date of Patent: Jul. 15, 2003

(54) METHOD FOR MACHINING WORKPIECES AND MACHINE TOOL

(75) Inventor: Peter Herren, Bellmund (CH)

(73) Assignee: Bystronic Laser AG, Niederonz (CH)

( * ) Notice: Subject to any disclaimer, the term of this patent is extended or adjusted under 35 U.S.C. 154(b) by 0 days.

(21) Appl. No.: 09/700,857

(22) PCT Filed: May 17, 1999

(86) PCT No.: PCT/CH99/00207

§ 371 (c)(1),
(2), (4) Date: Nov. 17, 2000

(87) PCT Pub. No.: WO99/59765

PCT Pub. Date: Nov. 25, 1999

(30) Foreign Application Priority Data

May 19, 1998 (EP) .............................. 98810464

(51) Int. Cl.$^7$ ..................... B23K 26/00; B23K 26/14; B23K 26/16

(52) U.S. Cl. ................ 219/121.67; 219/121.68; 219/121.69; 219/121.6; 219/121.73; 219/121.78

(58) Field of Search ...................... 219/121.78, 121.79, 219/121.81, 121.85, 121.67, 121.6–121.69, 121.73, 121.75; 700/95

(56) References Cited

U.S. PATENT DOCUMENTS

| | | | | |
|---|---|---|---|---|
| 3,803,379 A | * | 4/1974 | McRay ..................... | 219/121.6 |
| 4,628,441 A | * | 12/1986 | Johnstone et al. .......... | 318/603 |
| 4,698,480 A | * | 10/1987 | Klingel .................. | 219/121.67 |
| 5,105,523 A | * | 4/1992 | Howard ...................... | 156/294 |
| 5,272,805 A | * | 12/1993 | Akeel et al. ........... | 219/121.67 |
| 5,538,373 A | * | 7/1996 | Kirkham ...................... | 29/712 |
| 5,635,086 A | * | 6/1997 | Warren et al. ................ | 29/27 C |
| 5,775,215 A | * | 7/1998 | Hirate ........................ | 438/612 |
| 5,854,460 A | * | 12/1998 | Graf et al. ............. | 219/121.67 |
| 5,885,199 A | * | 3/1999 | Shao ........................... | 29/27 C |
| 5,900,171 A | * | 5/1999 | Karube et al. ........... | 219/121.6 |
| 5,917,726 A | * | 6/1999 | Pryor ........................... | 29/712 |
| 5,924,003 A | * | 7/1999 | Slocum ....................... | 438/612 |
| 5,961,858 A | * | 10/1999 | Britnell .................. | 219/121.63 |
| 5,961,862 A | * | 10/1999 | Lewis et al. ........... | 219/121.63 |
| 6,144,009 A | * | 11/2000 | Ulrich .................... | 219/121.67 |
| 6,393,687 B1 | * | 5/2002 | Friedrich ................ | 219/121.67 |

FOREIGN PATENT DOCUMENTS

JP 61-164738 A * 7/1986
WO WO 94/23885 A * 10/1994

OTHER PUBLICATIONS

Rofin–Sinar Laser GmbH, "Einfuhrung in die Industrielle Lasermaterialbearbertung", p. 42, 1997.

* cited by examiner

Primary Examiner—Tom Dunn
Assistant Examiner—L. Edmondson
(74) Attorney, Agent, or Firm—Schweitzer Cornman Gross & Bondell LLP

(57) ABSTRACT

Laser machining is often carried out using special machines or apparatus, with the workpieces having to be finished afterwards using appropriately equipped cutting machine tools. According to the invention, a laser beam (5) is supplied on the head-stock (17) of a machine tool (13), by means of a beam control tube (12). Said beam radiates into a focussing lens (35) at an articulation point (D). Said articulation point (D) is precisely guided and held in place in a centring cone (36) with its focussing lens (35) located underneath. The laser-machining head can be removed from the headstock (17) by means of a swivel mechanism and the machine (13) can carry out cutting operations in the usual way. The laser-machining operations are carried out before the cutting work in the processing cycle, a zero-offset being provided between the laser machining and the cutting work, correcting any system errors with the help of a computer.

10 Claims, 5 Drawing Sheets

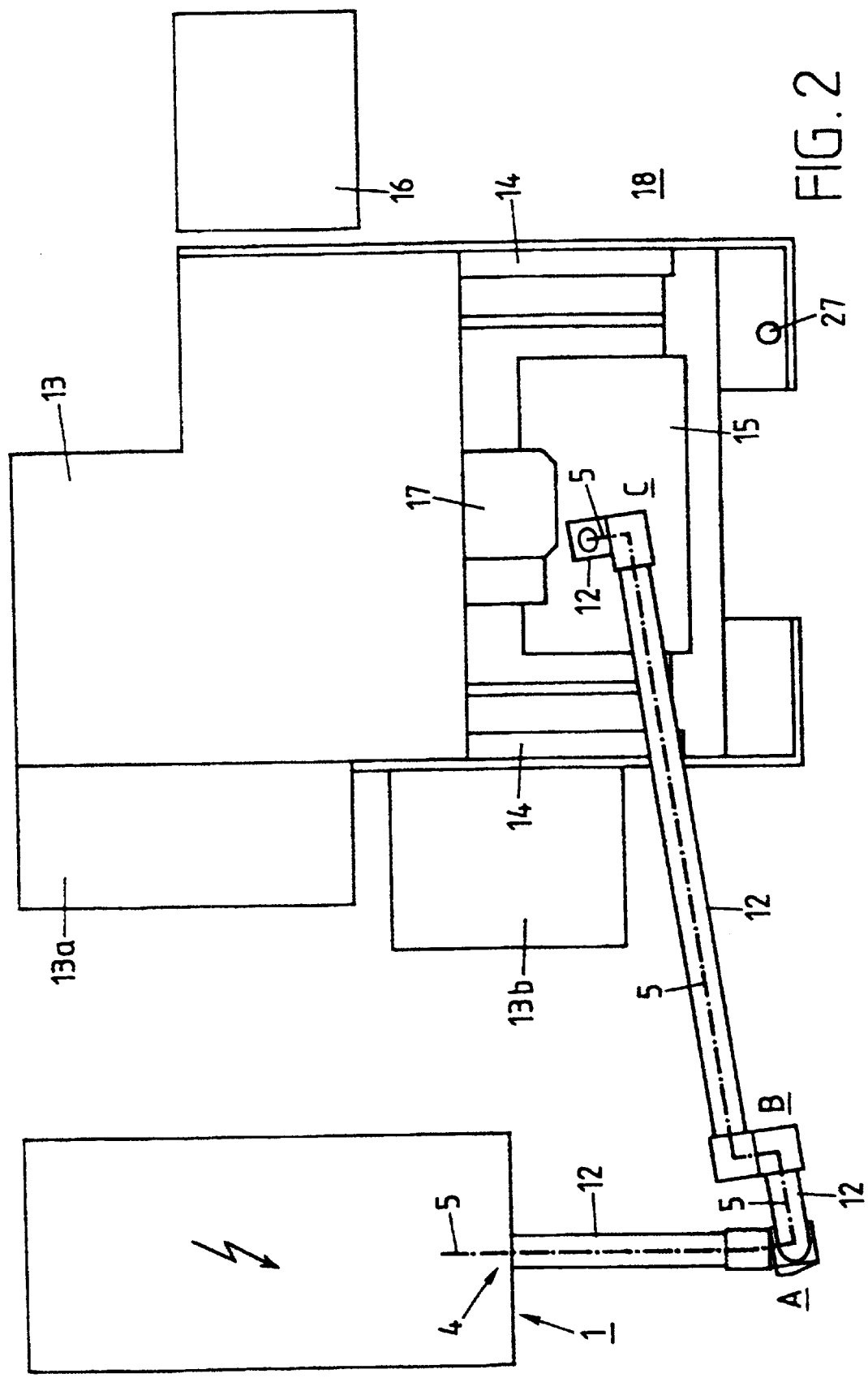

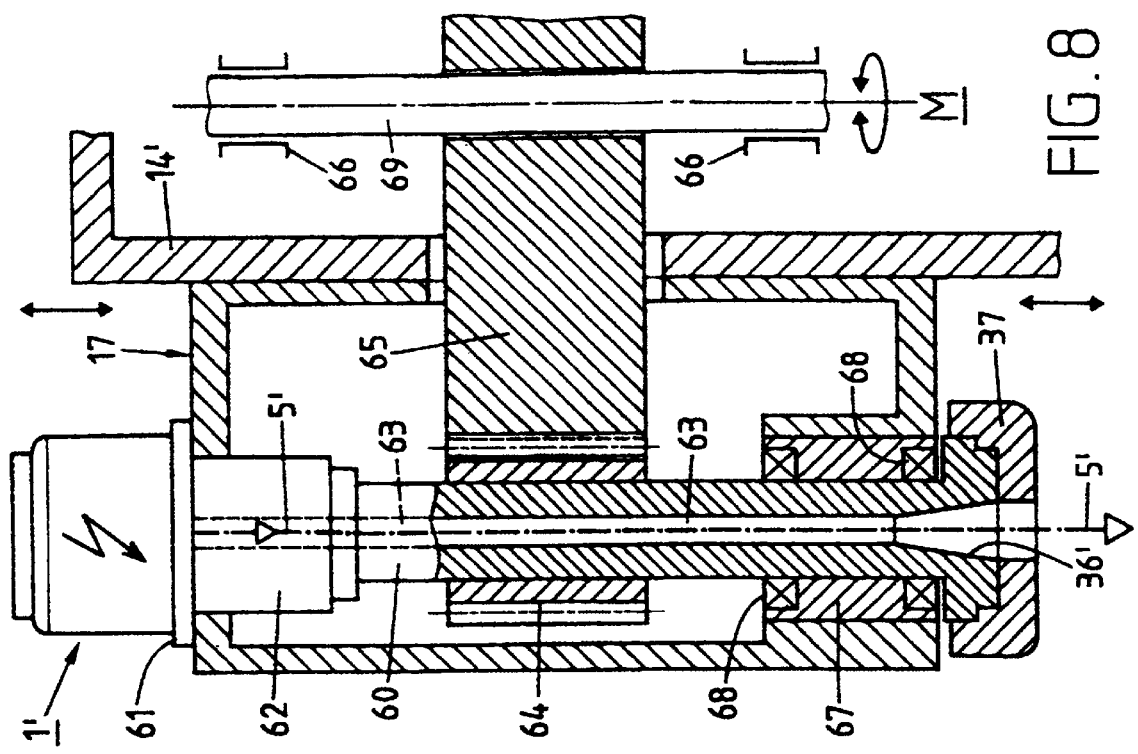
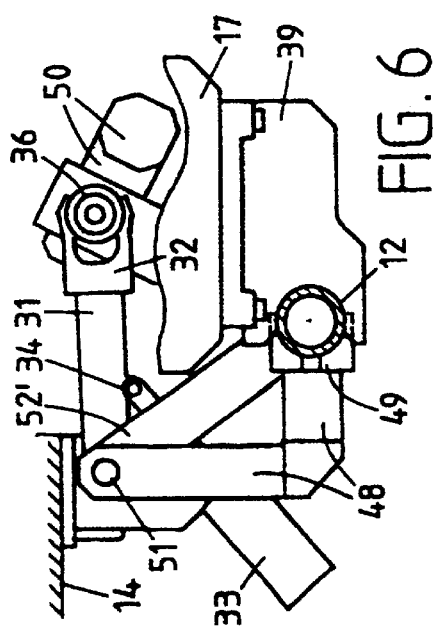
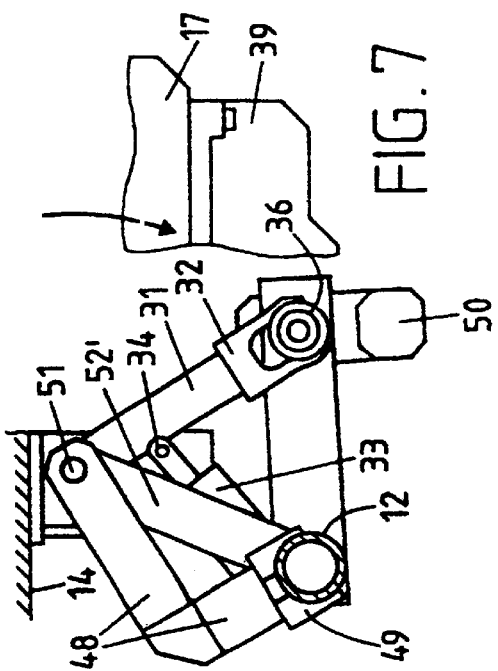

METHOD FOR MACHINING WORKPIECES AND MACHINE TOOL

The present invention relates to a method according to the preamble of the claim and to a machine tool suitable for implementing the method.

Laser stock machining has become established in a great many industrial manufacturing processes; using lasers it is possible to machine three-dimensional structures from virtually any material. By means of suitable laser sources, beam guides and optical devices, in conjunction with numerical controls, the workpieces can in many cases be finish-machined to the desired tolerance. However, in precision mechanics, more particularly precision engineering and micro-technology, there are ranges of application in which the accuracy and surface quality of the laser machining is insufficient and either finishing is necessary by means of conventionally operating machine tools, or the latter are used from the outset.

Performing laser operations on workpieces set up on other machines has also been repeatedly attempted in practice using robot-like devices, which has led to substantial and mostly intolerable inaccuracies and has required appropriate further finishing operations.

A method according to the preamble of claim 1 may be inferred from JP-A-61164738, according to which a laser source is arranged on a conventional CNC machining centre. By means of a vertical tool store in which a laser machining head is also stored along with cutting tools, cutting tools and optionally also the laser machining head with its cone on the spindle side are inserted by way of a tool-changing device into the bore of the main spindle of the machine. The laser machining head features mirrors which, because of the laser source flange-mounted on the headstock, guide a laser beam into the machining direction via a horizontal beam guide tube.

The drawback with this machining centre is the direct arrangement of the vibration-sensitive laser source on the headstock and the limitation to smaller outputs also associated with it for reasons of weight and space. The rough cutting operation and the conventional tool-changing device which causes sudden loads make precise finishing operations impossible and require fresh adjustment of the laser before every use of the said laser. Moreover, the open design of the beam guide is extremely susceptible to contamination, so that even just rough laser machining operations can only be performed with difficulty.

Another numerically controlled machine tool for two- or three-dimensional machining operations to which a laser source is connected is known from US-A-5160824. The laser beam, in the case of a laser machining operation, is guided through the hollow spindle of the machine tool and there emerges via an optical system and allows, in particular, the finishing of deep-hole bores. The optical system is provided with a clamping device which is compatible with those for cutting tools and when they are being used it is held, for example, by means of a tool-changing device.

The laser machining is thus limited to machine tools of which the main spindle has a hollow shaft and is designed in conjunction with high frequency motors above all for high-speed machining operations.

The object of the present invention is therefore to provide a method and a machine tool which extend the range of application of laser stock machining in an efficient manner and enhance the quality, more particularly the machining accuracy achievable on the workpiece. The overall accuracy of the system should be influenced solely by the particular machining method selected and not by a system change.

The subject of the invention is characterised by its ability to be particularly easily integrated into existing manufacturing processes.

The term inoperative/park position used in the claim refers to a position within the machine tool in which the laser device does not interfere with the cutting operation or the cutting operation cannot damage the laser machining head. The inoperative position and the park position may be identical; however, two different positions may be provided in order to shorten the set-up times, the inoperative position describing a pivoted-away position of the laser machining head which does not interfere with the next cutting operation. —Accordingly, the park position is defined as the position which does not affect cutting operations neither endangers the laser machining head.

Unlike the known arrangements in which a laser beam is guided to a dedicated laser machining centre, the subject of the invention allows all the original functions of a machine tool to continue to be used unreservedly, i.e. the cutting centre is extended by the addition of a further machining method without any cutbacks or losses of quality.

The coordination according to the invention of the laser source with a machine tool or machining centre can be achieved most easily by means of a flexible beam arm, known per se (K. H. Arnold GmbH & Co, D-882214 Ravensburg), with a constant beam path length; this requires only a few changes to be made to the machine tool or the addition to the numerical control program of an additional tool with appropriate parameters. The laser machining head is accommodated in the same tool holder as previous or subsequent operations, so that no stochastic errors are produced. Moreover, the inherent systematic error can be corrected, as a result of which only minimal stock allowances are required for the operations that follow. —It is thus only the machining method, and not the change from laser stock machining to cutting or vice versa, that affects the overall accuracy of the system.

The position accuracy of the laser beam is predetermined by the accuracy of the machine tool; the surface roughness of the resulting laser stock machining, on the other hand, is determined by the laser system used and by the material properties of the workpiece. In each case the dimensional accuracy and quality of the machining can be improved over that of laser machining by the subsequent use of cutting tools.

The emissions arising in the course of laser machining are within the range of that of cutting, so that, apart from glare protection, no other safety precautions on the machine tool are necessary.

The swivelling away of the laser machining head, after its use, enables the machine tool to be handled in the usual manner and prevents the said laser machining head from being damaged.

The beam guide is space saving and permits very easy tool changeover.

The zero correction allows statistical errors to be eliminated and stock allowances to be minimized in subsequent precision cutting operations.

A rigid design of the laser machining head produces the maximum axial and angular accuracy, it thus increases the accuracy of the machining and saves additional adjustment operations, so that only the usual necessary focusing of the beam is required.

In the case of a lateral beam supply, embodiments are expedient in which joints with conventional cooled metal mirrors are incorporated.

A direct mechanical connection of the laser machining head to the beam supply is space saving and economical.

A clamping device present on the laser machining head permits tool changeover, in the same way as is usual with the cutting tools.

A clamping device with a centring cone is particularly advantageous with respect to ease of handling and accuracy.

Incorporating a hollow shaft in the machine tool enables the laser beam to be guided particularly easily to the machining head.

With the aid of schematic drawings, the subject of the invention is explained below with respect to machine tools in cross-table construction with vertical main axes, the same reference numerals being used in all the Figures.

BRIEF DESCRIPTION OF THE DRAWINGS

FIG. 2 shows the machining centre of FIG. 1 in a plan view from above.

FIG. 6 shows the representation of FIG. 5 in the transfer position, in a view from above, FIG. 7 shows a representation corresponding to FIG. 6, in the park position and FIG. 8 shows a variant of a CNC machining centre with a flange-mounted laser source and a beam supply via its hollow spindle.

DESCRIPTION OF PREFERRED EMBODIMENT

Figure 1:
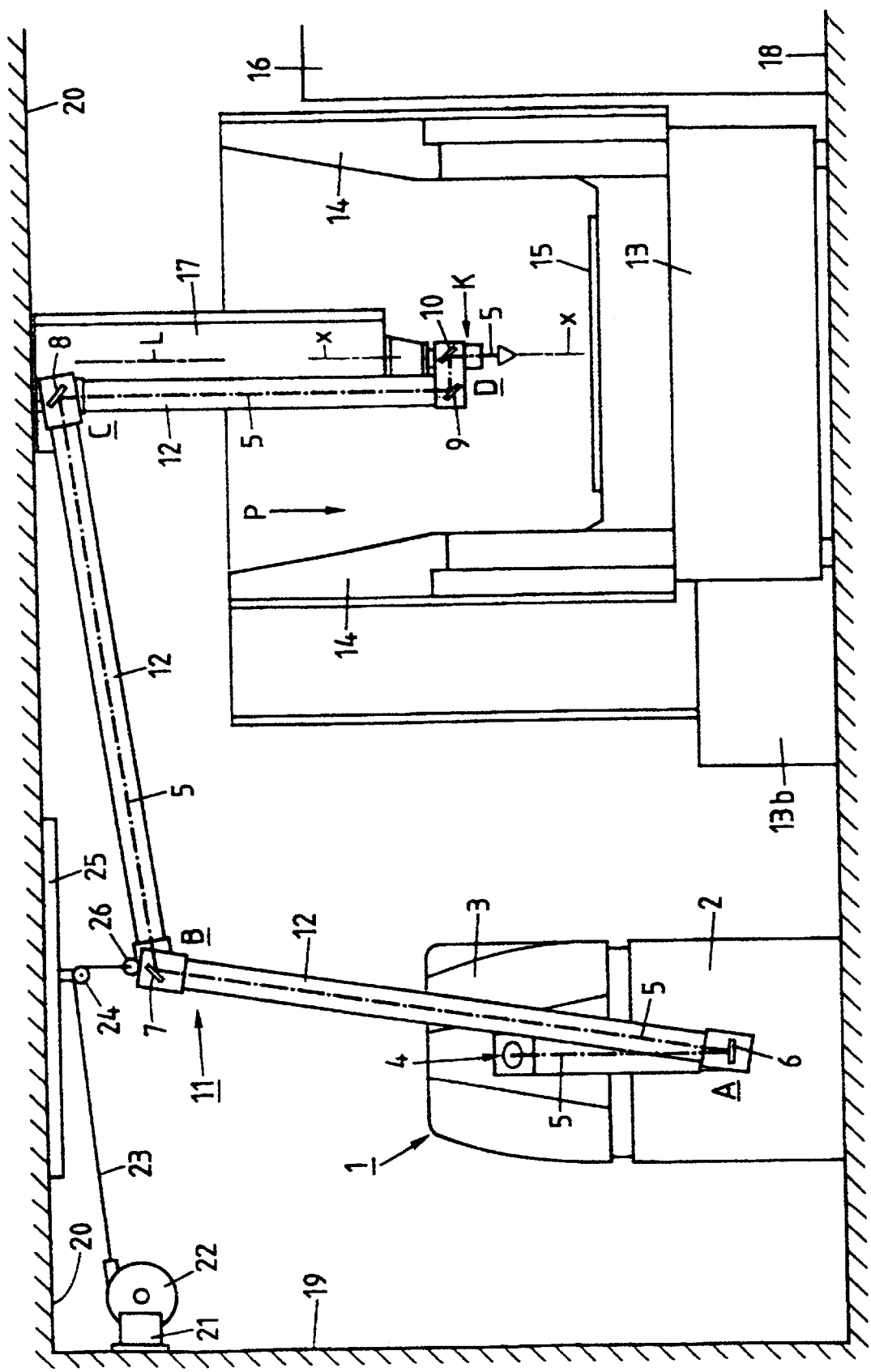
FIG. 1 shows a machining centre with a $CO_2$ laser and flexible beam arm, in front view.

A standard $CO_2$ laser (ROFIN-SINAR Laser GmbH, Hamburg) is designated in FIG. 1 by 1. It is mounted in a vibration-free manner on a base 2 on a workshop floor 18. A hood 3 acts as protection for the electrical and optical components of the laser arrangement. Arranged at the front end of laser 1 is a beam former 4, an adjustment section, which then feeds the collinear laser beam 5 into beam guide tubes 12. The laser beam 5 is guided via deviation mirrors 6–10 to a CNC machine tool 13 and is available there for machining purposes.

The standard beam guide tubes 12 are joined together as individual segments by way of joints A–D. The metal deviation mirrors 6–10 are situated in the joint points A–D, so that a constant optical path is produced irrespective of the position of the jointed arm 11. The jointed arm 11 has at joint point B an upper eye 26 into which a corresponding hook is engaged, the said hook being connected by a cable 23 via a guide pulley 24 to a roller rail 25 on the ceiling 20, and being subjected to spring tension via a cable drum 22. The cable drum 22 is attached to a wall 19 by means of supports 21 and relieves the jointed arm 11 of load, so that only a minimum force acts on the joint point D.

The beam guide tube 12 opening in the joint point D is oriented parallel to the vertical L which is here identical to the spindle axis; the optical axis x—x of a laser machining head K is in alignment with the spindle axis. Also visible is a machine bed 15 which serves for setting up the workpiece.

In the left-hand part of the machine tool, a park position P for the laser machining head K is indicated by a vertical arrow.

The machine tool 13 is a modified, standard CNC machining centre (HERMLE, C 800 U, D-78556 Gosheim) with a control (Sinumeric 840 D, Siemens AG, Munich). This machine 13 features a headstock 17 with a vertical motor spindle and has a solid machine column 14 and conventional auxiliary units 13b and a control panel 16 with integrated computer.

The arrangement according to FIG. 1 is indicated in FIG. 2 viewed from above and shows the same functional parts as well as other auxiliary units 13a; there is additionally provided, schematically, an emergency switch 27 for the laser which is in the form of a door monitoring switch.

Figure 3:
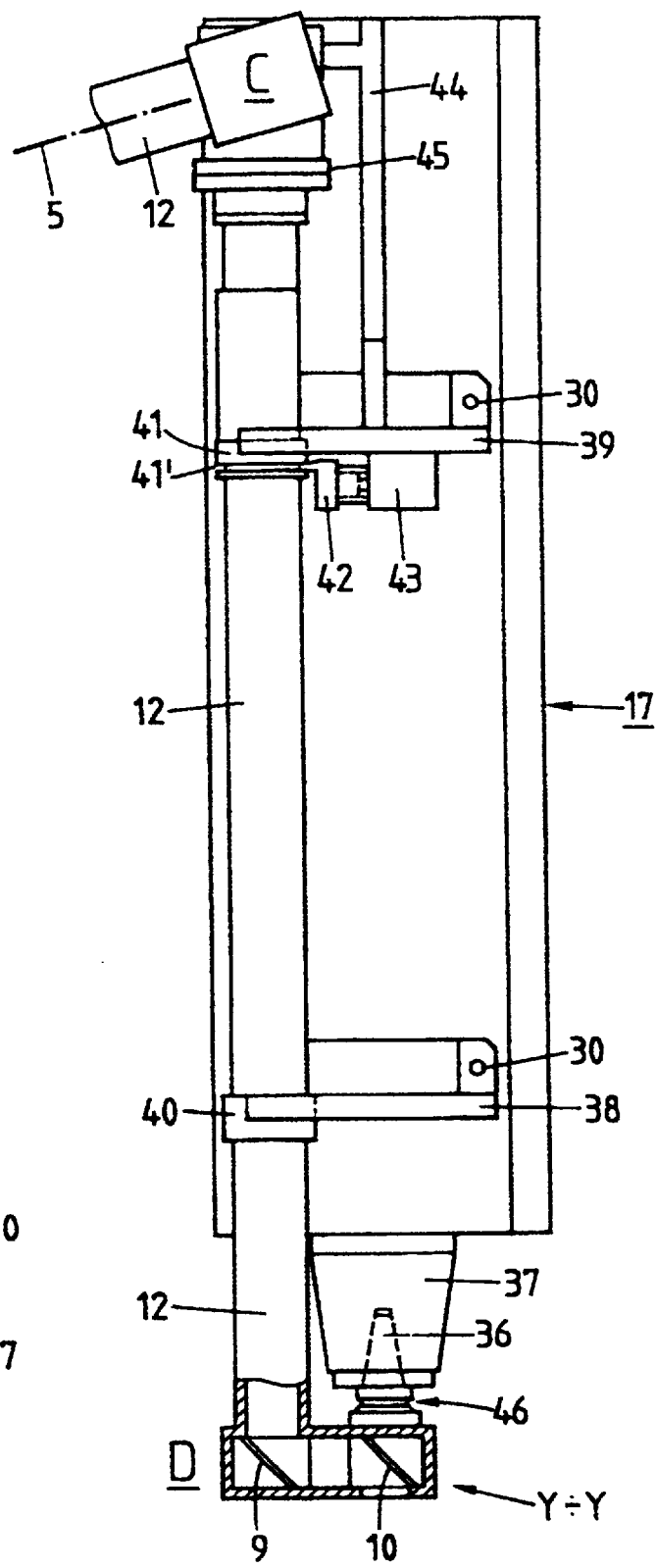
FIG. 3 shows details of the coupling of the laser beam into the machining centre.

FIG. 3 shows the simple and precise supply of the laser beam 5 by means of beam guide tubes 12 via a joint C. There are therefore two beam guide supports 38 and 39 screwed onto the headstock 17 of the machine tool 13 by means of mounting screws 30. In recesses on the left-hand side, the two supports 38 and 39 position the vertical beam guide tube 12 in its operational position. Provided on the beam guide tube 12 are a lower and an upper bearing bush 40 and 41 respectively, the bush 41 additionally having a clamping groove 41' into which fits the point of a gripper 42, of a pneumatic cylinder 43. The positively locking coordination of the bearing bushes 40 and 41 with the recesses in the supports 38 and 39 ensures precise and rotatable mounting of the beam guide tubes 12.

The joint C is joined via connecting flanges 45 to the vertical beam guide tube 12.

Figure 5:
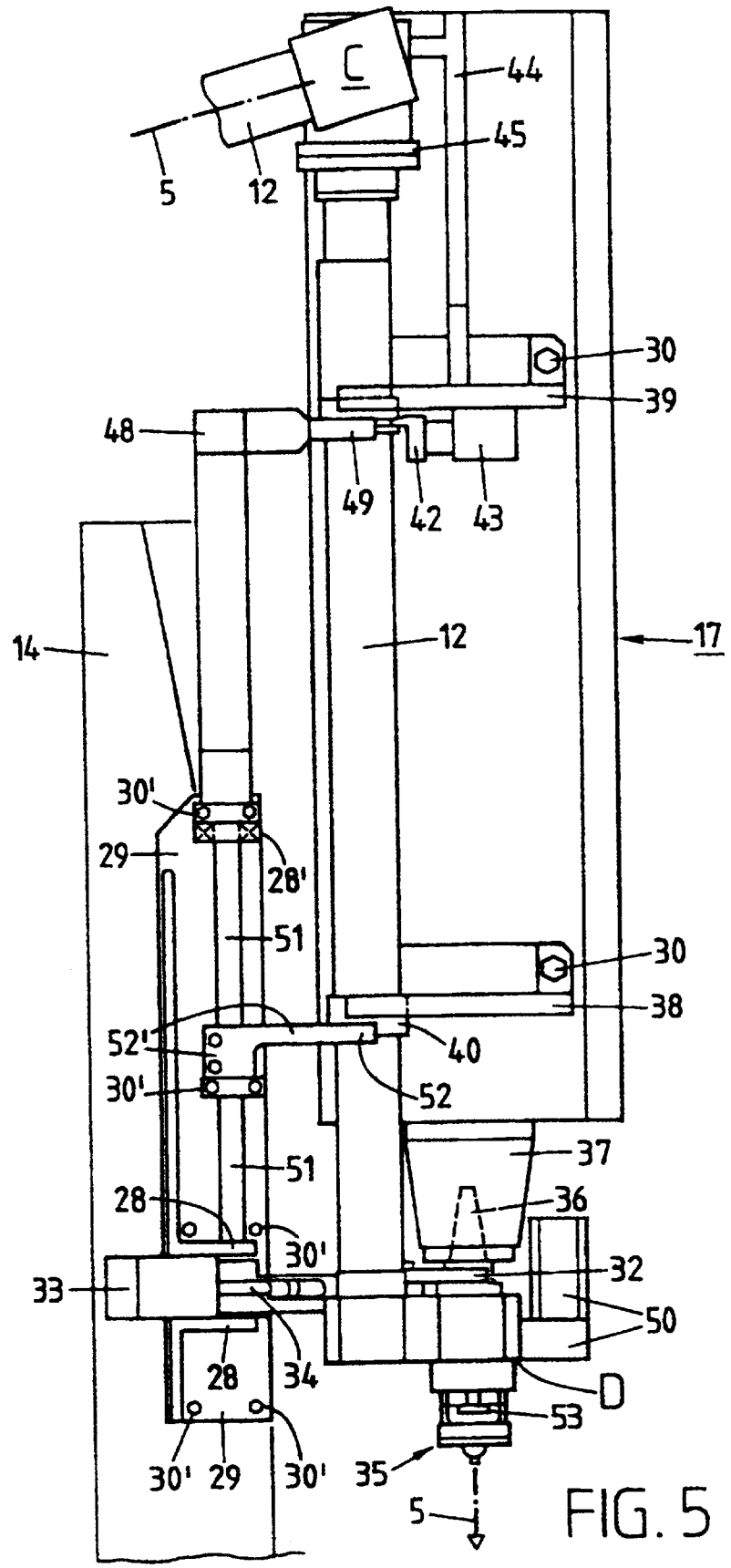
FIG. 5 shows details of the mechanical coupling-in of the laser optics and the beam guide.

The actual positioning of the laser optics removed in FIG. 3, cf. FIG. 5, position 35, is effected via the centring cone 36 provided in the machine tool in the tool-holding fixture 37. An annular groove 46 serves for the insertion and removal of the centring cone 36.

For reasons of clarity, only the deviation mirrors 9 and 10 are represented schematically in the partial section Y—Y, FIG. 3, in the joint D. Also visible are control lines 44 which are located in a protective tube.

Figure 4:
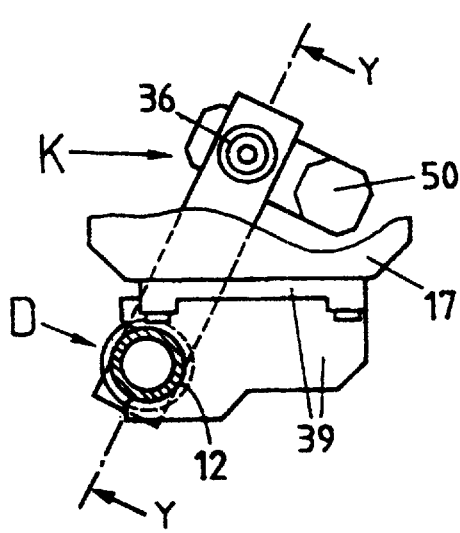
FIG. 4 shows a plan view according to FIG. 3 from above.

The plan view in FIG. 4 again shows the headstock 17 with the beam guide tube support 39 screwed to it and the beam guide tube 12 shown here in sectional representation. Visible projecting laterally is a spacing control 50 which adjusts the spacing of the laser optics from the workpiece in a manner known per se, by means of servo-motor. The centring cone 36 is represented by concentric circles; the section line Y—Y runs through this and the centre of the beam guide tube 12, for which reason the section Y—Y visible in FIG. 3 appears in a shortened oblique position.

To FIG. 5 are added the elements for mechanically coupling and decoupling the beam guide with/from the laser optics.

Located in hinged brackets 28 on a hinged support 29 screwed by means of mounting screws 30' to the also represented machine column 14 is a lower gripping arm 31 with gripping tongs 32 and a pivoting shaft 51; see FIG. 6.

The gripping arm 31 is operable by means of a drive cylinder 33.

The lower bearing bush 40 attached to the protective tube 12 is guided through a bearing part-ring 52 which is fixed via its arm 52' on the pivoting shaft 51 by means of mounting screws 30'.

The pivoting shaft 51 is guided again at an upper bearing 28' and ends in a square-shaped gripper arm 48 bent at a right angle, with attached gripper tongs 49 which are also in the form of a bearing part-ring. The gripper arm 48 consists in its vertical part of a hollow profile through which pneumatic and control lines are guided.

The joint point D is located in FIG. 5 in the operating position, i.e. the centring cone 36 is moved inside the tool-holding fixture 37. In this operating position the lower gripping tongs 32 are in engagement with their springs in the annular groove 46, FIG. 3.

Arranged in the axial direction of the centring cone 36 underneath the joint point D are focusing optics 35, designed in the known manner, comprising a manually operable adjusting ring 53; the emergent laser beam is again denoted 5.

FIG. 6 which follows shows the parts described above in plan view.

In order to swivel the laser machining device into its park and/or inoperative position after use, the centring cone 36 is pressed in the known manner out of the tool-holding fixture 37 and the headstock 17 is then moved upwards. The drive cylinder 33 is then acted upon with compressed air so that via the push rod 34 it turns the gripper arm 31 in the clockwise direction, in the direction of the arrow, cf. FIG. 7. For reasons of stability a reinforcement arm 52' is arranged between the pivoting shaft 51 and the gripper tongs 49.

The turning movement may be controlled so that the laser device can be swivelled both into a park position—close to the headstock 17—and into an inoperative position, laterally behind the headstock 17.

These two positions enable the machine tool to be operated properly and the laser device to be used immediately or to be moved away from the region of the headstock 17, producing the greatest possible flexibility when using the machining means.

The partial section representation of FIG. 8 shows a modified version of a standard machine tool, the machine column again being given the reference numeral 14'. Arranged above the headstock 17 in this case is a YAG laser 1' which rests on a hydraulic/pneumatic vibration bearing 61.

The emergent laser beam 5' passes through an upper spindle bearing 62 which is arranged on a hollow shaft 60 with a bore 63. Located between the upper spindle bearing 62 and a lower spindle bearing 67 is a spur gear 64 which for its part is driven via a motor M by means of a driving gear 65 with drive bearings 66, the said driving gear being displaceable on a spline shaft 69.

The spindle bearing 67 is equipped in the commonly known manner with taper-roller bearings 68. At its front end the hollow shaft 60 carries a tool-holding fixture 37 and inside has a centring cone 36'.

The arrangement according to FIG. 8 is particularly inexpensive and permits laser machining operations within the smallest possible space.

The ideas put forward with the aid of machine tools in cross-table construction with vertical main axes are of course also transferable to other machines and require in those cases more or less substantial modifications.

In machining centres in which a high laser output is not required, for instance when only markings and/or inscriptions are required, the laser can also be directly incorporated in the axes, for which solid-state lasers are suitable.

The variant according to FIG. 8 also produces the constant length of the beam guide demanded in the preamble of the claim; however, solutions are also conceivable in which this requirement is not fully met because of the mechanical decoupling between the laser and the machine tool—involving a deterioration in the beam quality.

The subject of the invention can naturally also be incorporated in metal-forming machines, particularly advantageously in cases in which stock-removal operations and/or cutting-off operations are expedient in one setting. Metal-forming operations by means of thermal measures, by means of laser heating, can also be supported in an analogous manner on the same machines.

LIST OF REFERENCE NUMERALS 1 laser ($CO_2$ laser, 2 kW)
1' laser (YAG laser on machine tool)
2 base
3 hood (cover)
4 beam former (adjustment section)
5 laser beam
5' laser beam of 1'
6–10 deviation mirrors
11 jointed arm
12 beam guide tube (protective tube)
13 CNC machine tool
13a,b auxiliary units of 13 (drive, cooling water etc.)
14,14' machine column; housing
15 machine bed/workpiece set-up
16 control panel with computer
17 headstock (main spindle; motor spindle)
18 floor (workshop)
19 wall
20 ceiling
21 support for 22
22 cable drum with spring tension
23 cable
24 guide pulley
25 roller rail
26 eye/hook
27 laser emergency switch/door monitoring switch
28 hinged brackets (flanges)
28' upper bearing
29 hinged support
30–30' mounting screws
31 gripper arm (lower)
32 gripping tongs (lower, with springs)
33 drive cylinder (pneumatic)
34 push rod
35 focusing optics
36,36' centring cones; clamping device
37 tool-holding fixture
38 lower beam guide tube support (bearing ring)
39 upper beam guide tube support (bearing ring)
40 lower bearing bush (fixed on tube 12)
41 upper bearing bush (fixed on tube 12)
41' clamping groove in 41
42 locking with gripper point
43 pneumatic cylinder for 42
44 control lines (protective tube)
45 connecting flanges
46 annular groove
48 gripper arm
49 gripper tongs
50 motor (spacing control)
51 pivoting shaft
52 bearing part-ring
52' arm for 52
53 adjusting ring for focusing
54 reinforcement for 48
60 hollow shaft
61 vibration bearing (pneumatic/hydraulic)
62 upper spindle bearing
63 bore in 60
64 spur gear on 60; vertically displaceable on 69
65 spur gear (drive)

66 drive bearing
67 lower spindle bearing
68 taper-roller bearing
69 spline shaft
A–D joints/joint points
K laser machining head
L main axis
M drive motor
P park position
x—x optical axis
Y—Y section edge/section

What is claimed is:

1. A method for two and three-dimensional machining of workpieces on a numerically controlled machine tool, more particularly a CNC machining center, by means of cutting tools and a laser machining device comprising a laser machining head, a laser source with attached beam forming means and beam guide for generating a laser beam and supplying it to the laser machining head, the laser machining head being mechanically pivotable and insertable into a tool holder of the machine tool, the laser machining head being moved during a cutting operation by a cutting tool into an inoperative/park position, comprising the steps of:

provide a tool holder capable of alternatively accepting both a cutting tool and a laser machining head for operating on a workpiece;

mounting the laser source in a vibration-free manner on a workshop floor;

supplying the laser beam to the laser machining head via a flexible beam arm with beam guide tubes and joint points to the laser machining head connected to a last beam guide tube while maintaining a constant beam guide length during movement and operation of the laser machining head;

maintaining the last beam guide tube orthogonal to a main axis of the machine tool and a next beam guide tube parallel to the main axis; and performing a changeover operation for the tool holder between the cutting tool and the laser machining head by swivelling the last beam guide tube orthogonally in relation to the main axis and having the machine tool replace the cutting tool in the tool holder with the laser machining head (swivelling the last beam guide tube orthogonally in relation to the main axis during a changeover operation for the tool holder between the cutting tool and the laser machining head.

2. A method according to claim 1, including the laser machining steps of:

causing the laser machining head to act on the workpiece and after its use swivelling the head into a park position;

measuring the coordinates of a mark and/or opening in the workpiece produced by the laser machining head;

performing a calculated zero correction to adjust the position of the workpiece in relation to the main axis; and performing a subsequent tool changeover and associated machining operation on the workpiece.

3. A machine tool for implementing the method according to claim 1, or 2, characterized in that the laser machining head has an optical axis having a portion fixed and coaxial to a main axis of the machine tool and includes means for directing the laser beam coaxially or laterally into the laser machining head.

4. A machine tool according to claim 3, characterized in that the laser source is coupled to a jointed arm comprising beam tubes and joints connected to the machine tool.

5. A machine tool according to claim 4, characterized in that the laser machining head includes focusing optics and is connected to a last joint of the jointed arm.

6. A machine tool according to claim 5, characterized in that the laser machining head has a clamping device which may be inserted and fixed in a tool-holding fixture of the machine tool.

7. A machine tool according to claim 6, characterized in that the clamping device is a centering cone.

8. A machine tool according to claim 3, characterized in that the laser source is axially displaceable and the machine tool includes fixedly mounted mirrors for directing the laser beam into the main axis of the machine tool and includes a headstock having a motor spindle in the form of a hollow shaft through which the laser beam is guided.

9. A machine tool according to claim 8, characterized in that the laser machining head is provided with a continuous bore with focusing optics which may be inserted and fixed in a holding fixture in the hollow shaft and which direct the laser beam coaxially to a workpiece.

10. A machine tool according to claim 7, characterized in that the laser source is flange-mounted on the machine tool and includes means to couple the laser beam into the hollow shaft.

* * * * *